US008347405B2

(12) United States Patent
Backhouse

(10) Patent No.: US 8,347,405 B2
(45) Date of Patent: Jan. 1, 2013

(54) ASYNCHRONOUS JAVA SCRIPT AND XML (AJAX) FORM-BASED AUTHENTICATION USING JAVA 2 PLATFORM ENTERPRISE EDITION (J2EE)

(75) Inventor: Richard A. Backhouse, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 11/965,470

(22) Filed: Dec. 27, 2007

(65) Prior Publication Data

US 2009/0172792 A1 Jul. 2, 2009

(51) Int. Cl.
*H04L 29/06* (2006.01)
*G06F 7/04* (2006.01)
(52) U.S. Cl. ............. 726/30; 713/161; 713/167; 726/18
(58) Field of Classification Search .................. 726/30
See application file for complete search history.

(56) References Cited

U.S. PATENT DOCUMENTS

| | | | | |
|---|---|---|---|---|
| 6,182,229 | B1* | 1/2001 | Nielsen | 726/8 |
| 7,788,341 | B1* | 8/2010 | Burns | 709/219 |
| 2005/0091539 | A1* | 4/2005 | Wang et al. | 713/201 |
| 2005/0114616 | A1* | 5/2005 | Tune et al. | 711/163 |
| 2006/0041554 | A1* | 2/2006 | Svendsen et al. | 707/9 |
| 2006/0047780 | A1* | 3/2006 | Patnude | 709/219 |
| 2007/0055864 | A1* | 3/2007 | Tock et al. | 713/155 |
| 2007/0118844 | A1* | 5/2007 | Huang et al. | 719/330 |

OTHER PUBLICATIONS

Wael Chatila, "Using AJAX for image oasswords", Sep. 18, 2005.*
Jesse James Garrett, "Ajax: A New Approach to Web Applications", Feb. 18, 2005.*
"Form-Based Authenication Using j_security_check", http://www.theserverside.com/discussions/thread.tss?thread_id=40114.
"Ajax Security: Container Managed Security", Frank Nimphius' Blogbuster, Apr. 24, 2006, http://www.orablogs.com/fnimphius/archives/001728.html.
Pontarelli, "J2EE Security: Container Versus Custon", Java World, http://www.javaworld.com/javaworld/jw-07-2004/jw-0726-security.html, Jul. 26, 2004.
Coukouma,"Passing Data with Dojo", Article 2005, http://www.atrus.org/writings/technical/dojo_demo/.
"Web.xml File", Websphere http://publib.boulder.ibm.com/infocenter/wasinfo/v6r0/index.jsp?topic=/com.ibm.websphere.express.doc/info/exp/ae/rweb_webxf.html.

* cited by examiner

*Primary Examiner* — Taghi Arani
*Assistant Examiner* — Mohammad L Rahman
(74) *Attorney, Agent, or Firm* — Thomas E. Lees, LLC

(57) ABSTRACT

An apparatus, system, and method are disclosed for Asynchronous Java Script and XML (AJAX) form-based authentication using Java 2 Platform Enterprise Edition (J2EE). The apparatus for AJAX form-based authentication using J2EE is provided with a plurality of modules configured to functionally execute the necessary steps for redirecting an AJAX client request to an authentication required servlet, issuing an AJAX response to the client, authenticate the user security credentials, and process the client request for secure data. In addition, a method of the present invention is also presented for programming Asynchronous Java Script and XML (AJAX) form-based authentication that avoids a page change using Java 2 Platform Enterprise Edition (J2EE).

25 Claims, 6 Drawing Sheets

US 8,347,405 B2

ASYNCHRONOUS JAVA SCRIPT AND XML (AJAX) FORM-BASED AUTHENTICATION USING JAVA 2 PLATFORM ENTERPRISE EDITION (J2EE)

BACKGROUND OF THE INVENTION

1. Field of the Invention

This invention relates to form-based authentication and more particularly relates to Asynchronous Java Script and XML (AJAX) form-based authentication using Java 2 Platform Enterprise Edition (J2EE).

2. Description of the Related Art

AJAX is a collection of technologies that give the web a dynamic capability lacking with standard web applications using Hyper Text Markup Language (HTML) pages interfaced with a server. Standard web applications require a page change or refresh to send information to the server in the form of a Hypertext Transfer Protocol (HTTP) request. Therefore, the user often interacts with a web page while the web page remains idle, not in communication with the server. It is only when the user activates a page change through a button or other method that the application interacts with the server. Meanwhile, the user sees the page change or refresh as the information is submitted and then returned by the server.

AJAX, conversely, allows server interaction without a page change, providing "asynchronous" data exchange between an idle web page and a server, thereby not affecting the display of the current webpage or browser behavior. This asynchronous exchange is made possible by Java Script code that connects with the server, sending and receiving data by the use of the XMLHttpRequest (XHR) object built into newer browsers. XHR requests often transfer data in the form of Extensible Markup Language (XML), HTML, plain text, or a Java Script Object Notation (JSON) object. Furthermore, a server-side technology such as ASP or J2EE is typically required with AJAX applications.

The authentication implementations available for AJAX web applications using J2EE webcontainers include Basic, Form, and Digest. Basic is most often used due to incompatibility issues with Form authentication and AJAX/J2EE applications. However, Basic authentication has several disadvantages including: no control over the authentication dialog displayed to the user, the password is encrypted with a simple and weak algorithm and stored in the request header, thereby requiring all requests to be made in HTTPS connections, and no reliable way is provided for the user to log off.

SUMMARY OF THE INVENTION

The present invention has been developed to provide an apparatus, system, and method for asynchronous AJAX form-based authentication using J2EE.

The apparatus for AJAX form-based authentication using J2EE is provided with a plurality of modules configured to functionally execute the necessary steps for redirecting an AJAX client request, issuing an AJAX response to the client, authenticating the user security credentials, and processing the client request. These modules in the described embodiments include a redirection module, a response module, an authentication module, and a processing module.

The redirection module, in one embodiment, redirects an AJAX client request to an authentication required servlet in response to detecting a client request for secure data. Also, the response module may issue an AJAX response to the client, the AJAX response directing the client to obtain user security credentials. In addition, the client may prompt a user for the user security credentials independent of a server-based security credential form. Also, the authentication module may authenticate the user security credentials using a web container authentication service, the user security credentials received by way of an AJAX form-based authentication request. Finally, the processing module may process the client request for secure data in response to a positive authentication of the user security credentials.

The processing module, in one embodiment, passes the authentication result to an authentication failed servlet in response to a rejection of the user security credentials. Also, the authentication failed servlet returns an AJAX response to the client comprising an authentication failure message and the client may indicates a security credential failure message. In another embodiment, the apparatus further comprises an invalidation module that redirects an AJAX logoff request to a session invalidation servlet, the session invalidation servlet invalidates a session object associated with the AJAX logoff request. The web container authentication service may also comprise a Java 2 Platform Enterprise Edition (J2EE) web container authentication service.

The AJAX form-based authentication request may, in one embodiment, comprise an XMLHttpRequest (XHR) request to a standard J2EE form-based Uniform Resource Locator (URL) "j_security_check," the XHR request comprising a user identification in a POST parameter named "j_username" and a user password in a POST parameter named "j_password." Additionally, the authentication failed servlet may return a Java Script Object Notation (JSON) object configured to indicate that authentication has failed. Furthermore, the authentication required servlet may also return a Java Script Object Notation (JSON) object indicating that authentication is required.

A computer program product is also presented for asynchronous AJAX form-based authentication using J2EE. Moreover, the computer program product performs the necessary steps as described above in relation to the apparatus. A system of the present invention is also presented for asynchronous AJAX form-based authentication using J2EE. The system may be embodied as a network to communicate data between a plurality of devices and a client in communication with the network. The client may send an AJAX request for secure data and prompt a user for user security credentials. The client may also manage one of a positive and a negative response from a form-based authentication submission. In addition, a server may be in communication with the network. Furthermore, the system also has the functionality described above in relation to the operation of the described apparatus.

A method of the present invention is also presented for programming Asynchronous Java Script and XML (AJAX) form-based authentication that avoids a page change using Java 2 Platform Enterprise Edition (J2EE). In one embodiment, the method includes defining security constraints in a web application deployment descriptor file on a web server, the deployment descriptor file designating secure requests for data. Furthermore, the method may include enabling form-based authentication in the web application deployment descriptor file on the web server. The deployment descriptor file may include a "form-login-config" element with a "authrequired" element registered to a first Uniform Resource Locator (URL) and an "authfailed" element registered to a second URL. The method may also include associating an "authrequired" servlet with the first URL and an "authfailed" servlet with the second URL. The "authrequired" servlet indicates that authentication is required and the "authfailed" servlet indicates that a login attempt has failed. Additionally, the method may include writing an AJAX request to a form-based Uniform Resource Locator (URL) labeled "j_security_check." The AJAX request may be written in Java Script and may pass a user-entered user identifier in a POST parameter labeled "j_username" and the user-entered password in a POST parameter labeled "j_password." Furthermore, the method may also define a callback handler on the client to manage a successful or unsuccessful authentication.

In one embodiment, the method includes writing an AJAX request in Java Script on the client to an invalidation Uniform Resource Locator (URL) registered to an "invalidation" servlet. The "invalidation" servlet calls HttpServletRequest.getSession( ).invalidate( ) to invalidate the user's session object. Furthermore, the "authrequired" servlet return message may comprise a JSON object. In addition, the "authfailed" servlet return message may also comprise a JSON object.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
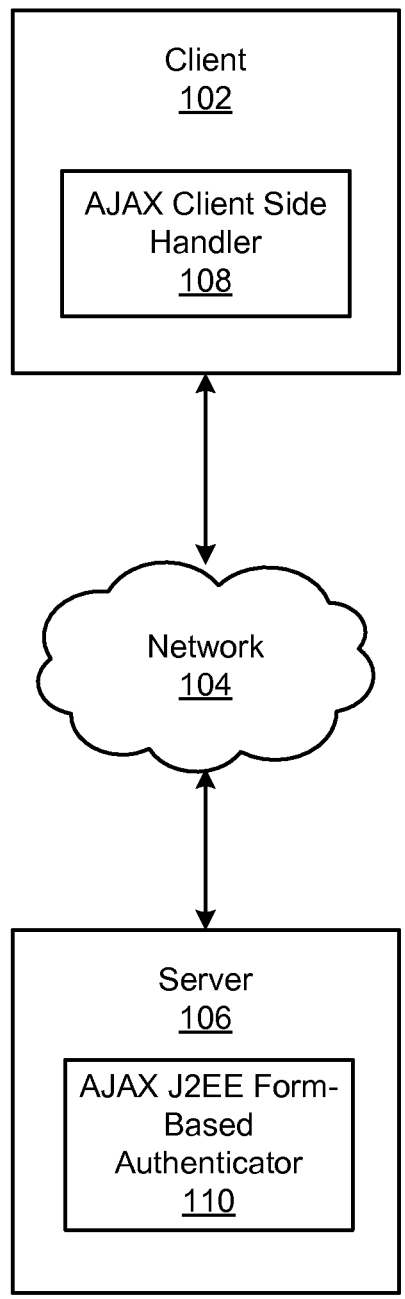
FIG. 1 is a schematic block diagram illustrating one embodiment of a system for asynchronous AJAX form-based authentication using J2EE.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for asynchronous AJAX form-based authentication using J2EE. The system 100 includes a client 102 with an AJAX Client Side Handler 108, a network 104, and a server 106 with an AJAX J2EE Form-Based Authenticator 110. Those of skill in the art recognize that the system 100 may be simpler or more complex than illustrated, so long as the system 100 includes modules or sub-systems that correspond to those described herein.

In one embodiment, the client 102 may comprise a software web browser such as Internet Explorer or Mozilla Firefox with XHR object and Java Script functionality. In addition, the client 102 may comprise an operating system such as Windows or Linux capable of executing the required web browser. The AJAX Client Side Handler 108 on the client 102 may include a browser running the client side of an AJAX-enabled web application. The code on the client side may consist of AJAX Java Script code capable of making asynchronous XHR requests to transfer data. The AJAX Client Side Handler 108 may also prompt a user for user security credentials in response to a message from the server 106 requiring authentication, or display a message that authentication has failed in response to a corresponding message from the server 106.

To implement the form-based authenticator, the server 106 may run a web server application which uses J2EE Web Containers. In addition, the server 106 may contain a web application deployment descriptor file configured to designate secure requests for data. This file may be a standard web.xml file located on the server side of many web applications. Furthermore, form-based authentication may be enabled in the file along with an "authrequired" URL and an "authfailed" URL. In addition, instances of secure data may also be designated in the file. For instance, all URLs ending or containing a certain path such as "/secure/" may be designated as secure and requiring authentication. Advantageously, the J2EE Web Containers will redirect any requests to these URLs to the appropriate authentication URL if authentication has not yet been performed. Along with the required URLs, corresponding servlets may be written, compiled to the server 106, and associated with these URLs. A method for programmatically implementing one embodiment of these server 106 modifications will be discussed below.

Figure 2:
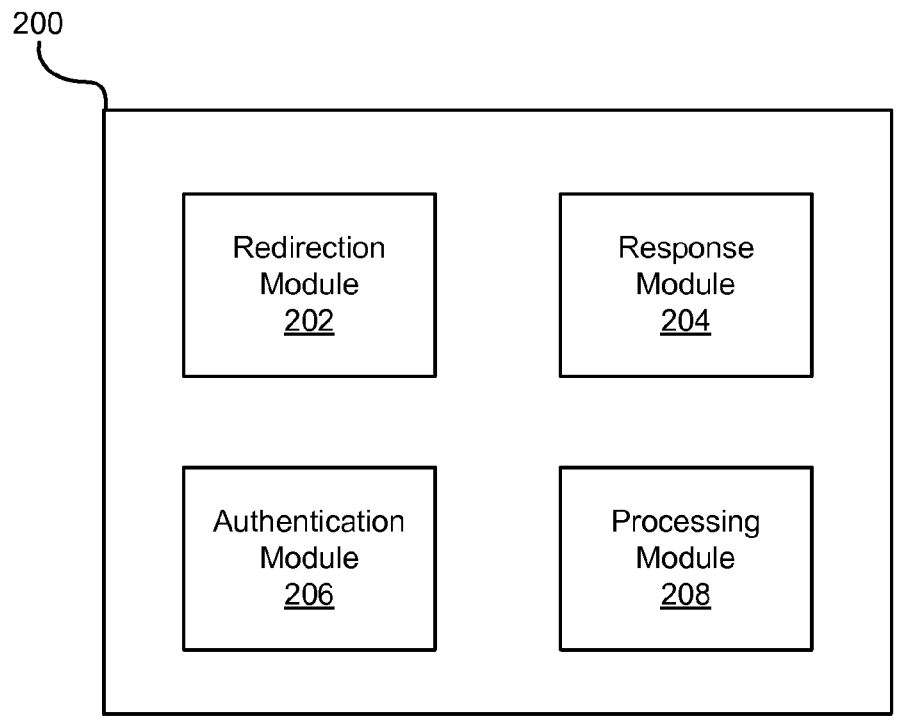
FIG. 2 is a schematic block diagram illustrating one embodiment of an apparatus for asynchronous AJAX form-based authentication using J2EE.

FIG. 2 illustrates one embodiment of an apparatus 200 for asynchronous AJAX form-based authentication using J2EE. The apparatus 200 depicts one embodiment of AJAX J2EE Form-Based Authenticator 110 located on the server 106 and includes a redirection module 202, a response module 204, an authentication module 206, and a processing module 208. In one embodiment, the redirection module 202 detects an AJAX client request for secure data and redirects the request to an authentication required servlet. The operations of the redirection module 202 may be performed by J2EE Web Containers which automatically redirects URLs that have been designated as being secure in the web.xml as described above. In this manner, embodiments of the present invention leverage the authentication and redirection capabilities of the J2EE Web Containers while obtaining the benefits of a client-side authentication interface and no page change on the client side to obtain authentication credentials. The response module 204 is issues an AJAX response by way of the authentication servlet to the client 102 directing the client 102 to obtain user security credentials. In one embodiment, the authentication required servlet returns a JSON object to the client 102 to indicate that authentication is required. A JSON object is a text-based representation of a data type. However, the servlet may also return a response using XML, plain text, or any other suitable format.

The user security credentials may consist of a username and password, Personal Identification Number (PIN) number, social security number, or any other form of unique identifier that may be used by a web application. In one embodiment, upon receiving this response from the server 106, the client 102 prompts a user for her user security credentials independent of a server-based security credential form. Therefore, while the client side application may use form-based security protocols, no actual form is used on the server side. In addition, form-based authentication allows greater customization on the client side over the authentication dialog displayed to the user.

The authentication module 206 authenticates the user security credentials using a web container authentication service. The authentication module 206 first receives the credentials by way of an AJAX form-based authentication request. In some embodiments, the web container authentication service comprises a Java 2 Platform Enterprise Edition (J2EE) web container authentication service. Furthermore, the AJAX form-based authentication request may comprise an XHR request to a required J2EE form-based URL "j_security_check." In addition, the XHR request may send the user identification in a POST parameter named "j_username" and may send the user password in a POST parameter named "j_password." Using these parameter names, the authentication module 206 simulates a conventional form submission.

The processing module 208 the client request for secure data in response to a positive authentication of the user security credentials. Furthermore, because form-based authentication does not actually store the password in the HTTP headers there is more flexibility to use regular HTTP requests once the authentication has been successful. Once the user has been successfully authenticated, the secure data may be sent to the client 102 with AJAX using an XHR request without a page change as discussed above. In addition, because form-based authentication does not actually store the password in the HTTP headers, there is more flexibility to use standard HTTP requests once the authentication has been successful. If the user security credentials are invalid, however, the processing module 208 passes the authentication result to an authentication failed servlet in response to a rejection of these credentials. In turn, the authentication failed servlet returns an AJAX response to the client 102 comprising an authentication failure message, the client 102 configured to indicate a security credential failure message. In one embodiment, the authentication failed servlet returns a JSON object to indicate that authentication has failed. However, the servlet may also return a response using XML, plain text, or any other suitable format.

Figure 3:
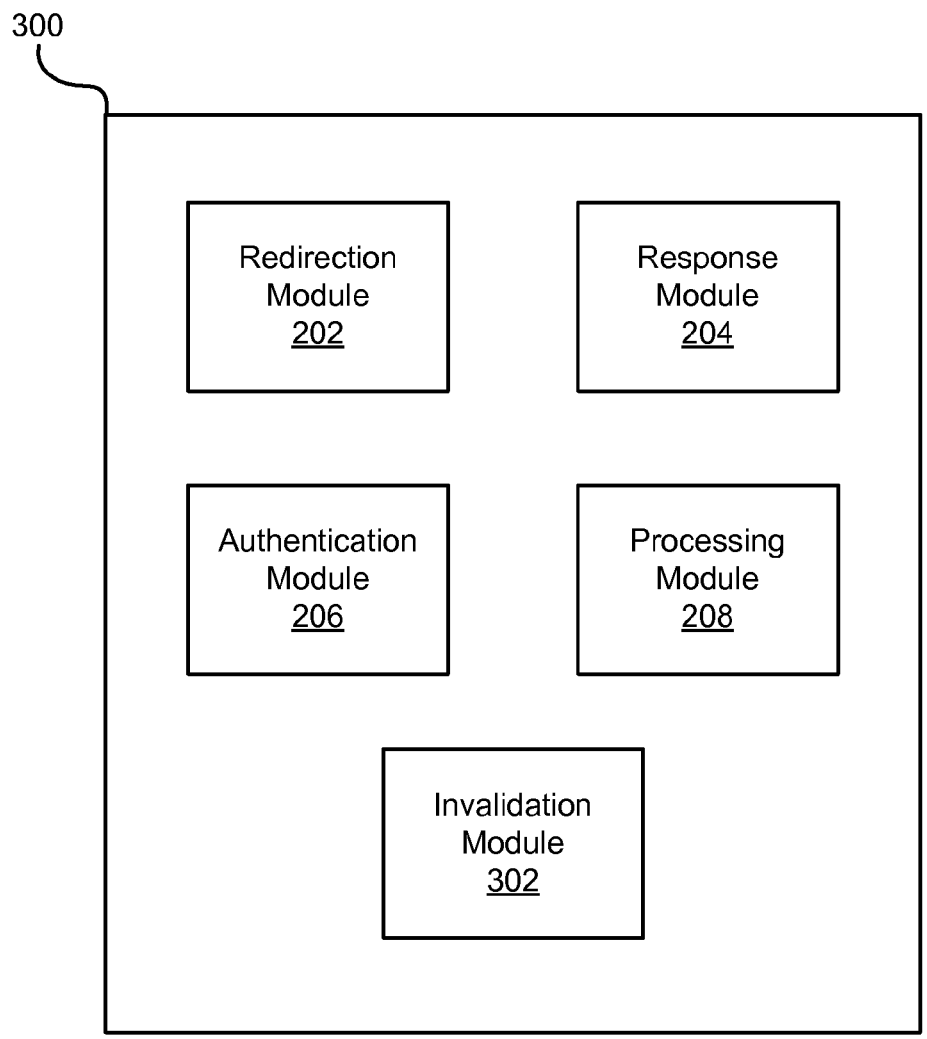
FIG. 3 is a detailed schematic block diagram illustrating one embodiment of an apparatus for asynchronous AJAX form-based authentication using J2EE.

FIG. 3 illustrates another embodiment of an apparatus 300 for asynchronous AJAX form-based authentication using J2EE. The apparatus 300 includes the redirection module 202, a response module 204, an authentication module 206, and a processing module 208, wherein these modules include substantially the same features as described above with relation to FIG. 2.

Additionally, the apparatus 300 may contain an invalidation module 302. The invalidation module 302 may redirect an AJAX logoff request to a session invalidation servlet. This servlet invalidates a session object associated with the AJAX logoff request. This module allows a user to logoff, a feature possible with only with form-based authentication. For example, a user using a computer in a public place and logged onto an ecommerce website, may wish to logoff to prevent others from accessing his ecommerce account. The user may click an onscreen button or menu selection which causes the client 102 to send an AJAX logoff request. The logoff request is redirected to a session invalidation servlet which invalidates the user's session and prevents others from accessing his account. Unlike non-AJAX web applications, no page change occurs during the logoff process.

Figure 4:
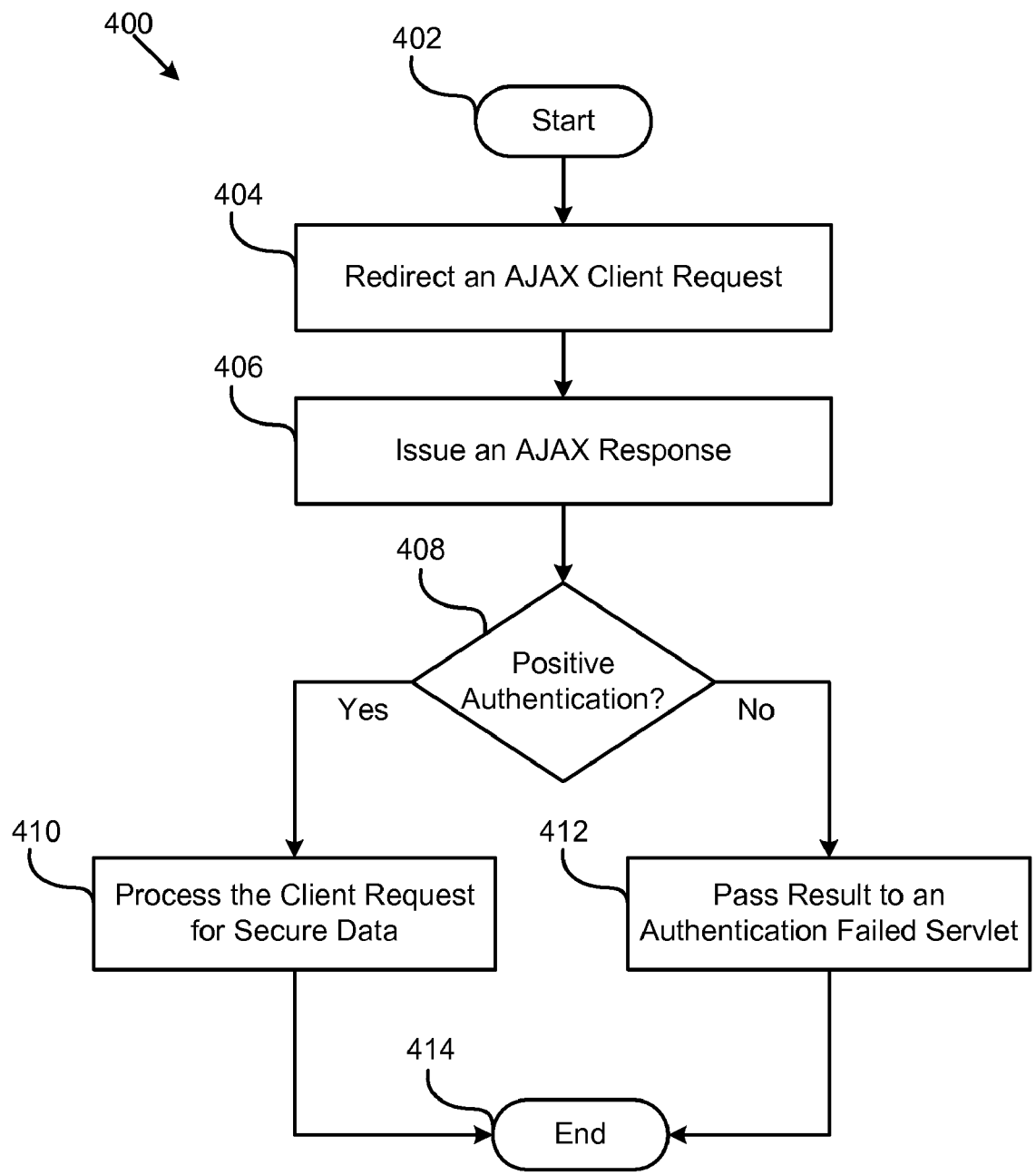
FIG. 4 is a schematic flow chart diagram illustrating one embodiment of a method for asynchronous AJAX form-based authentication using J2EE.

FIG. 4 illustrates one embodiment of a method 400 for asynchronous AJAX form-based authentication using J2EE. The method 400 may be implemented by the executed operations of a computer program product. The method 400 or operation may start 402 when the redirection module 202 redirects 404 an AJAX client request for secure data to an authentication required servlet. The response module 204 then issues 406 an AJAX response to the client 102 directing the client 102 to obtain user security credentials. In one embodiment, if the authentication module 206 makes a positive authentication 408 of the user security credentials, the processing module 208 processes 410 the client request for secure data and the method 400 or operation ends 414. Alternatively, the authentication module 206 may reject 408 the user security credentials. The processing module 208 then may pass 412 the authentication result to an authentication failed servlet and the method ends 414.

For example, the redirection module 202 of a bank account website redirects 404 an AJAX client request to access sensitive financial data to an authentication required servlet. The response module 204 issues 406 an AJAX response through the authentication required servlet to the client 102 to obtain the user's name and password. The authentication module 206 makes a positive identification 408 of the name and password using a J2EE web container authentication service and the processing module 208 processes 410 the client request for the financial information, allowing the financial information to be requested by the client 102.

Figure 5:
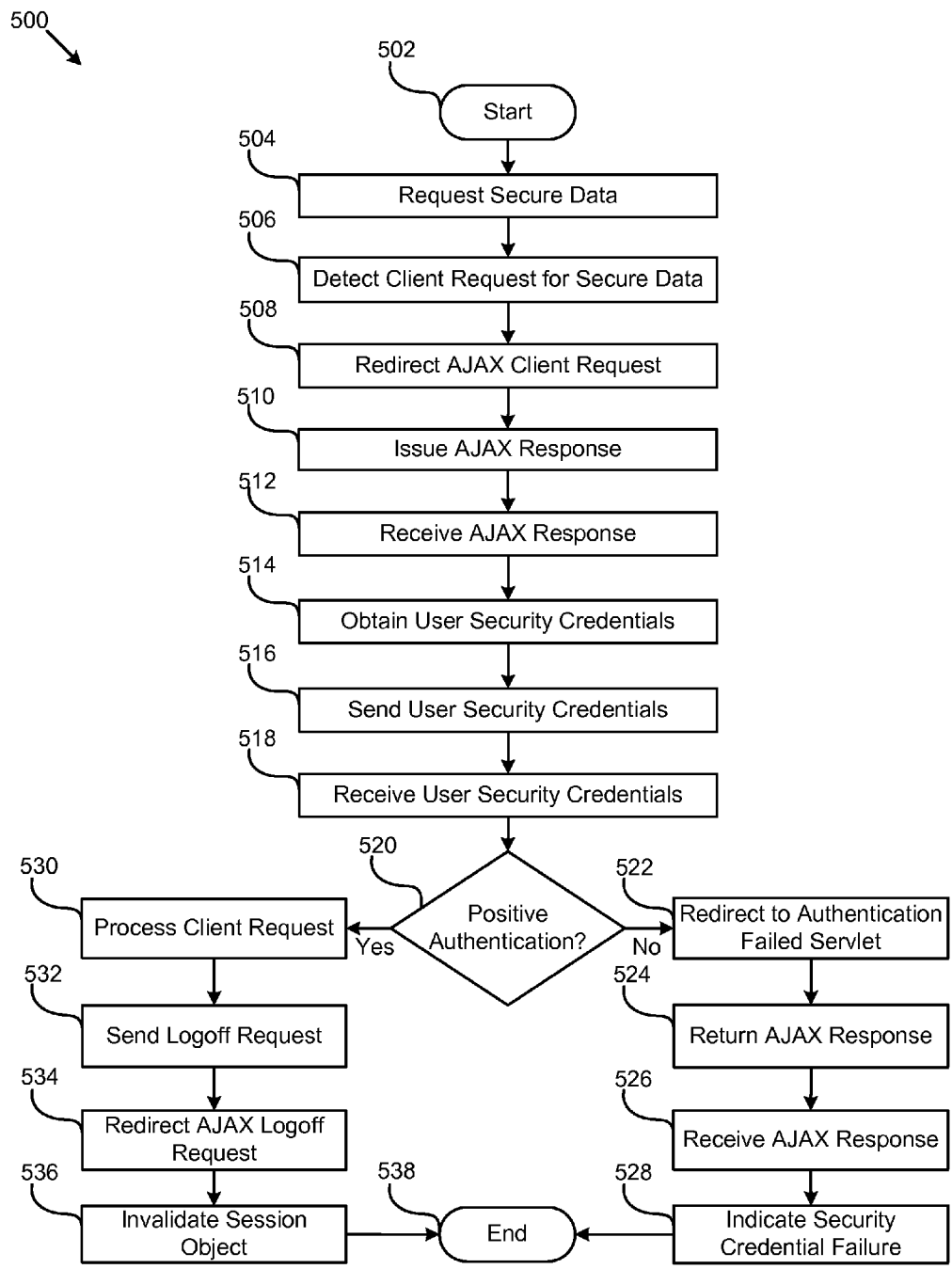
FIG. 5 is a detailed schematic flow chart diagram illustrating one embodiment of a method for asynchronous AJAX form-based authentication using J2EE.

FIG. 5 illustrates a detailed embodiment of a method 500 for asynchronous AJAX form-based authentication using J2EE. The method 500 may also be implemented by the executed operations of a computer program product. The method 500 or operation starts 502 when a client 102 requests 504 secure data from the server 106. The redirection module 202 detects 506 the client request for secure data and redirect 508 the request to an authentication required servlet. The redirection 508 may be performed by J2EE Web Containers as configured by the web.xml file. Next, the response module 204 issues 510 an AJAX response to the client 102, directing the client 102 to obtain user security credentials. The client 102 receives 512 this AJAX response from the server 106 and prompts 514 the user for the user security credentials. The client 102 may prompt 514 the user with standard HTML code, Java Script, Java code, or other similar programming methods.

Next, the client 102 sends the user security credentials 516 to the server 106 by way of an AJAX form-based authentication request. The server 106 receives 518 the user security credentials by way of the request. In one embodiment, if the authentication module 206 makes a positive authentication 520 of the user security credentials, the processing module 208 processes 530 the client request for secure data. After a user has been authenticated, he may access secure data until such time as he wishes to logoff. In some embodiments, to logoff, the client 102 sends 532 an AJAX logoff request. The invalidation module 302 redirects 534 the logoff request to a session invalidation servlet which invalidates 536 the session object, logs the user off, and the method 500 or operation ends 538.

Alternatively, if the authentication module 206 rejects 520 the user security credentials, the processing module 208 redirects 522 the authentication result to an authentication failed servlet. Next, the authentication failed servlet returns 524 an AJAX response to the client 102 comprising an authentication failure message. Finally, the client 102 receives 526 the AJAX response, indicates 528 a security credential failure message, and the method 500 or operation ends 538.

For example, a user may wish to access her shopping cart on an ecommerce website which uses AJAX and J2EE. The user selects an HTML button to view her shopping cart. The client 102 makes an XHR request 504 for the shopping cart data from the server 106. The shopping cart pages have been marked as secure in the web.xml file on the server 106. The redirection module 202 detects 506 the client request for pages marked as secure and redirects 508 the request to an authentication required servlet. The response module 204 issues 510 an XHR response to the client 102, directing the client 102 to obtain user security credentials. The client 102 receives 512 this XHR response and prompts 514 the user for her user name and password using a customized dialog box. The user enters her information and again selects an HTML button. The client 102 sends 516 the user name and password using another XHR request. The server 106 receives 518 the user name and password by way of the request, makes a positive authentication 520 of the user name and password, and the processing module 208 processes 530 the client request for secure data. The user views her shopping cart and then presses an HTML button to log off. The client 102 sends 532 an AJAX logoff request, the invalidation module 302 redirects 534 the logoff request to a session invalidation servlet which invalidates 536 the session object and logs the user off. To the user, the entire transaction has occurred without a page refresh, as all data was exchanged using AJAX XHR requests "behind the scenes."

Figure 6:
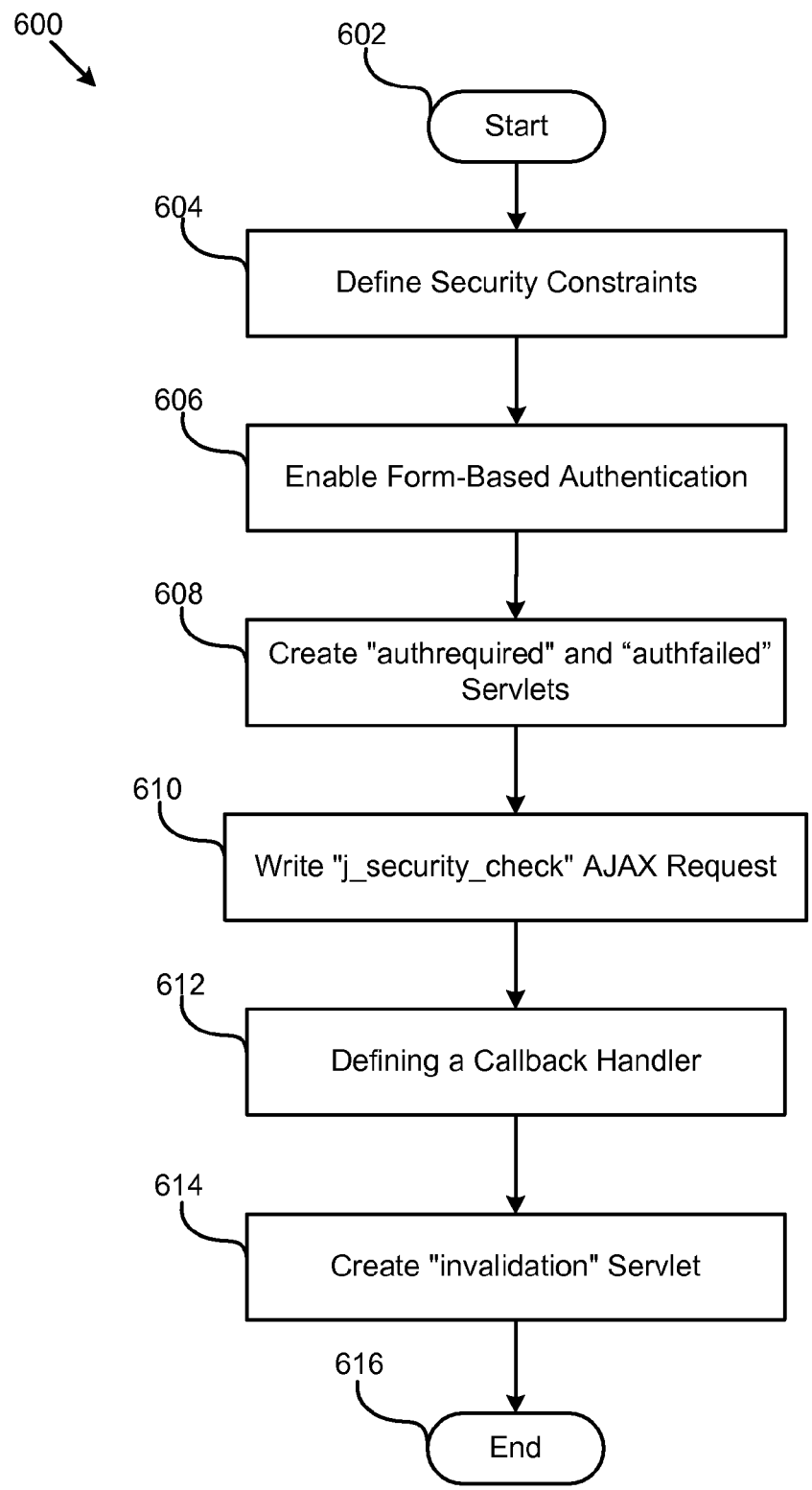
FIG. 6 is a schematic flow chart diagram illustrating one embodiment of a method for programming AJAX form-based authentication that avoids a page change using J2EE.

FIG. 6 illustrates one embodiment of a method 600 for programming AJAX form-based authentication that avoids a page change using J2EE. It will be appreciated by those skilled in the art that other code configurations may be used in place of the following examples. Beneficially, form-based AJAX authentication may be enabled on a client and server without major application or code changes. Furthermore, the method of implementing these changes is highly flexible. One such method 600 starts 602 by defining 604 security constraints in a web application deployment descriptor file on a web server. This file may be a standard web.xml file, and may be configured to designate secure requests for data. For example, the following web.xml sample shows defined security constraints:

```
<web-resource-collection>
    <web-resource-name>secure</web-resource-name>
    <url-pattern>/secure/*</url-pattern>
</web-resource-collection>
```

EXAMPLE CODE 1

In the web application pertaining to the above example, all URLs with the path containing "/secure/" followed by the file name, will be treated as secure by the application and will require authentication.

Next, the method 600 then enables 606 form-based authentication in the N web.xml. This may be done by including a "form-login-config" element with a "authrequired" element registered to a first URL and an "authfailed" element registered to a second URL as follows:

```
<login-config>
    <auth-method>FORM</auth-method>
    <form-login-config>
        <form-login-page>/authrequired</form-login-page>
        <form-error-page>/authfailed</form-error-page>
    </form-login-config>
</login-config>
```

EXAMPLE CODE 2

Next, "authrequired" and "authfailed" servlets are created 608 to be called in case of the need to authenticate or the failure to authenticate respectively. The authrequired servlet is associated with the first URL and an authfailed servlet is associated with the second URL in the web.xml file. Furthermore, the authrequired servlet may be configured to notify the client 102 that authentication is required. The authrequired servlet may notify the client 102 by means of a return message in the form of a Java Script Object Notation (JSON) object. The servlet may be configured as follows:

```
protected void service(HttpServletRequest request, HttpServletResponse response) throws ServletException, IOException {
    response.setContentType("text/json; charset=utf-8");
    JSONObject authRequired = new JSONObject( );
    authRequired.put("msg", "You need to authenticate");
    authRequired.serialize(response.getWriter( ));
}
```

EXAMPLE CODE 3

In addition, the authfailed servlet may be configured to indicate that a login attempt has failed. The authfailed servlet may also notify the client 102 by means of a return message in the form of a Java Script Object Notation (JSON) object. The servlet may be configured as follows:

```
protected void service(HttpServletRequest request, HttpServletResponse response) throws ServletException, IOException {
    response.setContentType("text/json; charset=utf-8");
    JSONObject authFailed = new JSONObject( );
    authFailed.put("msg", "Authentication failed");
    authFailed.serialize(response.getWriter( ));
}
```

EXAMPLE CODE 4

In one embodiment, the method 600 includes writing 610 an AJAX request to a form-based URL labeled "j_security_check." In this manner, the AJAX application simulates a standard form-based submission, while still allowing asynchronous data communication. Any standard HTML code to input user credentials may be used such as:

```
<h2><span>Please enter your username and password</span></h2>
<table border="0">
    <tbody>
        <tr>
            <td><span>Username</span></td>
            <td><input id="userid" name="submittedUserId" type="text" value="" /></td>
            <td></td>
        </tr>
        <tr>
            <td><span>Password</span></td>
            <td><input id="password" type="password" name="submittedPassword" /></td>
            <td></td>
        </tr>
    </tbody>
</table>
<table>
    <tr>
        <td><input id="login" type="button" value="Login" name="Login" onClick="formlogin( )"></td>
        <td><input id="logout" type="button" value="Logout" name="Logout"
```

```
    onClick="formlogout( )" disabled="true"></td>
  </tr>
</table>
```

EXAMPLE CODE 5

The AJAX request to pass the user credentials consists of: a user-entered user identifier in a POST parameter labeled "j_username" and the user-entered password in a POST parameter labeled "j_password." The client side Java Script code may be programmed as follows, having been called in a function shown above named "formlogin( )":

```
function formlogin( ) {
    var userid = document.getElementById("userid")
    var password = document.getElementById("password")
    var bindArgs= {
        url: "j_security_check",
        method: "post",
        mimetype: 'text/json',
        headers: {
            accept: "text/json"
        },
        content: {
            j_username: userid.value,
            j_password: password.value
        },
        load: function(type, evaldObj, http) {
            writeStatus("Login Request successful");
        },
        error: function(type, error, xhr, kwArgs) {
            writeStatus("Login Request failed ["+error+"]
                ["+xhr.status+"]");
        }
    };
    dojo.io.bind(bindArgs);
}
```

EXAMPLE CODE 6

In another embodiment, the method includes then defining 612 a callback handler on the client side application configured to manage a successful or unsuccessful authentication. The client 102 is programmed to expect a response from the authrequired servlet and prompt the user for a user id and password. The client 102 may also be programmed to expect a response from the authfailed servlet and re-prompt the user for a user id and password, or report that the user credentials have failed.

In some embodiments, the method 600 includes creating 614 an "invalidation" servlet. This may include inserting an AJAX request in Java Script on the client 102 to an invalidation URL registered to the servlet in a similar manner as described above in relation to the authrequired and authfailed servlets. The invalidation servlet may log the user off by invalidating the user's session object. This may be performed functionally by calling the method HttpServletRequest.getSession( ).invalidate( ) in the invalidation servlet. One embodiment of an invalidation servlet is as follows:

```
protected void service(HttpServletRequest request, HttpServletResponse
response) throws ServletException, IOException {
    request.getSession( ).invalidate( );
    response.setContentType("text/json; charset=utf-8");
```

```
    JSONObject logout = new JSONObject( );
    logout.put("msg", "Logged out");
    logout.serialize(response.getWriter( ));
}
```

EXAMPLE CODE 7

After the invalidation servlet has been created, the method 600 ends 616.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for Asynchronous Java Script and XML (AJAX) form-based authentication using Java 2 Platform Enterprise Edition, the apparatus comprising:
   a server having a processor coupled to a memory, wherein the processor is programmed to perform authentication by executing computer code implementing:
      a redirection module configured to:
         detect whether an AJAX request received from an AJAX-enabled application on a client requires access to data marked as secure; and
         redirect the AJAX request to an authentication required servlet in response to detecting that the AJAX request requires access to data marked as secure;
      a response module configured to issue an AJAX response to the AJAX-enabled application on the client if the AJAX request is redirected to the authentication required servlet, the AJAX response, independently of a server-side security credential form, directing the AJAX-enabled application on the client to obtain user security credentials and to return the obtained security credentials to the server;
      an authentication module configured to authenticate the user security credentials using a web container authentication service, the user security credentials received by way of an AJAX form-based authentication request such that the authentication module simulates a conventional form submission without actually using a form on the server-side; and
      a processing module configured to process the AJAX request in response to a positive authentication of the user security credentials.

2. The apparatus of claim 1, wherein the processing module is further configured to pass the authentication result to an authentication failed servlet in response to a rejection of the user security credentials, the authentication failed servlet returning an AJAX response to the client comprising an authentication failure message, the client configured to indicate a security credential failure message.

3. The apparatus of claim 1, further comprising an invalidation module configured to redirect an AJAX logoff request to a session invalidation servlet, the session invalidation servlet configured to invalidate a session object associated with the AJAX logoff request.

4. The apparatus of claim 1, wherein the web container authentication service comprises a Java 2 Platform Enterprise Edition web container authentication service.

5. The apparatus of claim 1, wherein the AJAX form-based authentication request comprises an XMLHttpRequest (XHR) request to a standard Java 2 Platform Enterprise Edition form-based Uniform Resource Locator (URL) "j_security_check," the XHR request comprising a user identification in a POST parameter named "j_username" and a user password in a POST parameter named "j_password."

6. The apparatus of claim 1, wherein the processing module is further configured to pass the authentication result to an authentication failed servlet in response to a rejection of the user security credentials, and wherein the authentication failed servlet returns a Java Script Object Notation (JSON) object configured to indicate that authentication has failed.

7. The apparatus of claim 1, wherein the authentication required servlet returns a Java Script Object Notation (JSON) object configured to indicate that authentication is required.

8. A computer-readable storage device with executable program code stored thereon, the program code for Asynchronous Java Script and XML (AJAX) form-based authentication using Java 2 Platform Enterprise Edition, wherein the program code is executable to perform:
 issuing, by an AJAX-enabled application on a client, an AJAX request to a server for secure data, the server configured to detect whether an AJAX request sent from a client requires access to data marked as secure and to redirect the AJAX request to an authentication required servlet in response to detecting that the AJAX request requires access to data marked as secure;
 receiving an AJAX response from the server, the AJAX response, independently of a server-side security credential form, directing the AJAX-enabled application on the client to obtain user security credentials;
 simulating a form-based submission by prompting a user for the user security credentials independent of a server-based security credential form; and
 calling a client-side Java application to send the user security credentials by way of a AJAX form-based authentication request to the server in response to receiving the user-entered security credentials, the server configured to authenticate the user security credentials using a web container authentication service and process the client request for secure data in response to a positive authentication of the user security credentials.

9. The computer-readable storage device of claim 8, wherein the program further instructs the processor to perform: receiving an AJAX response from the server, the AJAX response comprising an authentication failure message, and indicating a security credential failure message, the server configured to pass the authentication result to an authentication failed servlet in response to a rejection of the user security credentials.

10. The computer-readable storage device of claim 8, wherein the program further instructs the processor to perform: sending an AJAX logoff request to the server configured to redirect the AJAX logoff request to a session invalidation servlet, the session invalidation servlet configured to invalidate a session object associated with the AJAX logoff request.

11. The computer-readable storage device of claim 8, wherein the web container authentication service comprises a Java 2 Platform Enterprise Edition web container authentication service.

12. The computer-readable storage device of claim 8, wherein the AJAX form-based authentication request comprises an XMLHttpRequest (XHR) request to a standard Java 2 Platform Enterprise Edition form-based URL "j_security_check," the XHR request comprising a user identification in a POST parameter named "j_username" and a user password in a POST parameter named "j_password."

13. The computer-readable storage device of claim 8, wherein the server is configured to pass the authentication result to an authentication failed servlet in response to a rejection of the user security credentials, and the authentication failed servlet returns a Java Script Object Notation (JSON) object configured to indicate that authentication has failed.

14. The computer-readable storage device of claim 8, wherein the authentication required servlet returns a Java Script Object Notation (JSON) object configured to indicate that authentication is required.

15. A system for Asynchronous Java Script and XML (AJAX) form-based authentication using Java 2 Platform Enterprise Edition, the system comprising:
 an AJAX-enabled application on a client in communication with a network, the AJAX-enabled application on the client configured to:
  send an AJAX request for secure data;
  simulate a form-based submission by prompting a user for user security credentials, independent of a server-based security credential form by way of java script source code; and
  manage one of a positive and a negative response from a form-based authentication submission;
 a server including a processor coupled to memory, wherein the server is in communication with the network and is configured to:
  detect whether the AJAX request sent from the AJAX-enabled application on the client requires access to data marked as secure; and
  redirect the AJAX request to an authentication required servlet in response to detecting that the AJAX request requires access to data marked as secure;
  issue an AJAX response to the client, the AJAX response, independently of a server-side security credential form, directing the client to obtain user security credentials;
  pass the user security credentials received from the AJAX-enabled application, as an AJAX form-based authentication request to a web container authentication service;
  authenticate the user security credentials using a web container authentication service, the user security credentials received by way of the AJAX form-based authentication request; and
  process the client request for secure data in response to a positive authentication of the user security credentials.

16. The system of claim 15, wherein the server is further configured to pass the authentication result to an authentication failed servlet in response to a rejection of the user security credentials, the authentication failed servlet returning an AJAX response to the client comprising an authentication failure message, the client configured to indicate a security credential failure message.

17. The system of claim 15, wherein the server is further configured to redirect an AJAX logoff request to a session invalidation servlet, the session invalidation servlet configured to invalidate a session object associated with the AJAX logoff request.

18. The system of claim 15, wherein the web container authentication service comprises a Java 2 Platform Enterprise Edition web container authentication service.

19. The system of claim 15, wherein the AJAX form-based authentication request comprises an XMLHttpRequest (XHR) request to a standard Java 2 Platform Enterprise Edition form-based Uniform Resource Locator (URL) "j_security_check," the XHR request comprising a user identification in a POST parameter named "j_username" and a user password in a POST parameter named "j_password."

20. The system of claim 15, wherein the server is further configured to pass the authentication result to an authentication failed servlet in response to a rejection of the user security credentials, and the authentication failed servlet returns a Java Script Object Notation (JSON) object configured to indicate that authentication has failed.

21. The system of claim 15, wherein the authentication required servlet returns a Java Script Object Notation (JSON) object configured to indicate that authentication is required.

22. A computer-readable storage device with executable program code stored thereon, the program code for implementing Asynchronous Java Script and XML (AJAX) form-based authentication using Java 2 Platform Enterprise Edition, wherein the program code is executable to:
   determine whether an AJAX request received from an AJAX-enabled application on a client is a request for data marked as secure or not marked as secure;
   redirect the AJAX client request to an authentication required servlet in response to determining that the AJAX request is for data marked as secure;
   issue an AJAX response to the AJAX-enabled application on the client if the AJAX request is redirected to the authentication required servlet, the AJAX response, independently of a server-side security credential form, directing the AJAX-enabled application on the client to obtain user security credentials and to return the obtained security;
   authenticate the user security credentials using a web container authentication service, the user security credentials received by way of an AJAX form-based authentication request such that the authentication module simulates a conventional form submission without actually using a form on the server-side; and
   process the client request for secure data in response to a positive authentication of the user security credentials.

23. The computer-readable storage device of claim 22, wherein the program is further configured to pass authentication result to an authentication failed servlet in response to a rejection of the user security credentials, the authentication failed servlet returning an AJAX response to the client comprising an authentication failure message.

24. The computer-readable storage device of claim 22, wherein the program is further configured to redirect an AJAX logoff request to a session invalidation servlet, the session invalidation servlet configured to invalidate a session object associated with the AJAX logoff request.

25. The computer-readable storage device of claim 22, wherein the authentication required servlet returns a Java Script Object Notation (JSON) object configured to indicate that authentication is required.

* * * * *